US005733219A

United States Patent [19]

Rettig et al.

[11] Patent Number: 5,733,219

[45] Date of Patent: Mar. 31, 1998

[54] APPARATUS AND METHOD FOR DISABLING A COMPRESSION BRAKE SYSTEM

[75] Inventors: Mark E. Rettig, Peoria; Thomas R. Sandborg, Mapleton, both of Ill.

[73] Assignee: Caterpillar Inc., Peoria, Ill.

[21] Appl. No.: 648,525

[22] Filed: May 13, 1996

[51] Int. Cl.[6] .......... B60K 41/28

[52] U.S. Cl. .......... 477/91; 123/322; 123/323; 477/107

[58] Field of Search .......... 477/90, 91, 92, 477/107, 181, 295, 196, 198, 201, 202, 204; 123/320, 321, 322, 324

[56] References Cited

U.S. PATENT DOCUMENTS

| | | | |
|---|---|---|---|
| 5,121,723 | 6/1992 | Stepper et al. | 123/322 |
| 5,393,276 | 2/1995 | White et al. | 477/91 |
| 5,540,201 | 7/1996 | Feuch et al. | 123/320 X |

FOREIGN PATENT DOCUMENTS

| | | | |
|---|---|---|---|
| 63-1725 | 1/1988 | Japan | 123/323 |
| 63-277827 | 11/1988 | Japan | 123/323 |
| 2-277931 | 11/1990 | Japan | 123/323 |
| 59-39944 | 3/1994 | Japan | 123/323 |

*Primary Examiner*—Khoi Q. Ta
*Attorney, Agent, or Firm*—R. Carl Wilbur

[57] ABSTRACT

An apparatus is provided for controlling a compression brake on an internal combustion engine. the apparatus includes means for automatically disabling the compression brake once the vehicle speed falls below a predetermined value.

9 Claims, 3 Drawing Sheets

APPARATUS AND METHOD FOR DISABLING A COMPRESSION BRAKE SYSTEM

TECHNICAL FIELD OF THE INVENTION

The present invention relates generally to electronically controlled engines and, more particularly, to an electronically controlled engine equipped with a compression braking system.

BACKGROUND ART

Vehicles such as on-highway trucks often use compression brakes to assist in slowing the vehicle, without operating the vehicle service brakes. A compression brake slows the vehicle by manipulating the intake and exhaust valves to remove energy from the engine. Typically, the compression brake permits air to enter the cylinder during the intake cycle, and allows the engine to compress the air as the piston moves toward top dead center. Compressing the air transfers work from the piston to the compressed air. That work is then released as the piston reaches top dead center by opening the exhaust valve. In this manner the work required to compress the air is then expelled and a corresponding retarding force is transmitted through the transmission to the rear wheels thereby assisting in slowing the vehicle.

When the compression brake is operating, it typically is very noisy. The noise results from opening the exhaust valve and quickly releasing the compressed air. In some instances the noise may be objectionable to the vehicle operator. In other instances cities and towns have enacted regulations prohibiting the use compression brakes within the city limits. In those cases, operators that use a compression brake within city limits are subject to fines.

Typically there is a dash-mounted switch within the vehicle that permits the operator to enable or disable the compression brake system. Generally there is also an additional switch that controls the number of cylinders involved in the compression braking and therefore controls the braking force produced by the compression braking system. To avoid the fines that may result from using the compression brake within city limits, a vehicle operator must manually disable the braking system using the dash-mounted switch. However, because the braking system is only engaged under certain operating conditions, the operator may not be aware that the compression brake is enabled until the brake actually engages. At that point the braking system will have already emitted the noise and the operator may have been fined.

The present invention is directly toward overcoming one or more of the drawbacks associated with prior art compression braking systems.

SUMMARY OF THE INVENTION

In one aspect of the present invention an apparatus is disclosed for controlling the speed of a vehicle equipped with an internal combustion engine and a compression braking system. The apparatus includes a vehicle speed sensor which is connected to an electronic controller. The vehicle speed sensor produces a vehicle speed signal and the electronic controller disables the compression braking system as a function of the vehicle speed signal.

In another aspect of the present invention, a method of operating a compression brake on an internal combustion engine in a vehicle is disclosed. The method includes the steps of determining the speed of the vehicle and disabling the compression brake in response to the step of determining the speed of the vehicle.

These and other aspects of the present invention will become apparent upon reading the detailed description of the preferred embodiment in conjunction with the drawings and appended claims.

DETAILED DESCRIPTION OF A PREFERRED EMBODIMENT

Figure 1:
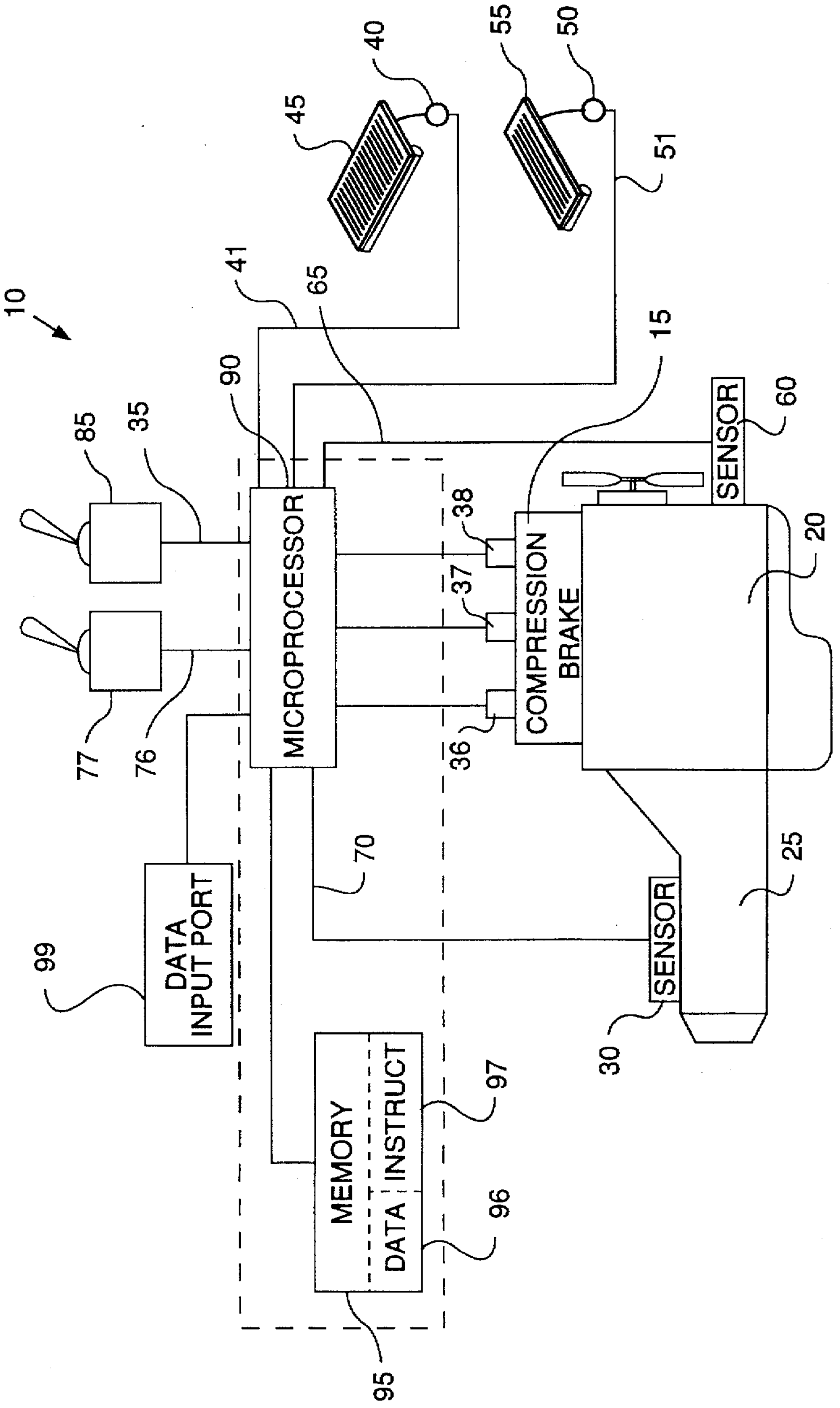
FIG. 1 is a block diagram of the various components and connections associated with a preferred embodiment of the present invention.

Referring first to FIG. 1, a preferred embodiment of the compression brake control system 10 of the present invention is shown in block diagram form. The compression brake control system 10 preferably includes a compression brake 15 connected to the engine 20. The connection between the compression brake and the engine is known to those skilled in the art. The connection between the compression brake 15 and the engine 20 will therefore not be discussed herein. The engine 20 is connected to a transmission 25 that drives a rear axle (not shown) which in turn drives the rear wheels or other propulsion means of the vehicle.

An electronic control module 35 ("ECM") is connected to solenoids 36, 37, 38 which are associated with and drive components in the compression brake 15 to cause the compression brake 15 to engage. The ECM 35 is also connected to a clutch position sensor 40 associated with a clutch pedal 45 in the operator compartment of the vehicle. In a preferred embodiment, the clutch sensor 40 includes a two-position switch that produces a first signal when the clutch pedal is fully depressed and the clutch is engaged and a second signal when the clutch pedal is not depressed and the clutch is disengaged. However, any suitable sensor that outputs a position signal may be used without deviating from the scope of the present invention.

The ECM 35 is also connected by connector 51 to a throttle position sensor 50 associated with a throttle pedal 55 preferably located in the operator compartment of the vehicle. In a preferred embodiment, the throttle pedal position sensor 50 is a potentiometer type device as disclosed in U.S. Pat. No. 4,915,075 issued to Brown. However, other suitable position sensors are known in the art and may be readily and easily substituted for the position sensor disclosed in Brown, without deviating from the scope of the present invention as defined by the appended claims. The ECM is also electrically connected to a engine speed sensor 60. The engine speed sensor preferably includes a magnetic pick up sensor adapted to produce a signal corresponding to the rotational speed of the engine 20. One suitable sensor is disclosed in U.S. Pat. No. 4,972,332 which issued to Luebbering et al. on Nov. 20, 1990. The sensor 60 produces a signal on electrical connector 65 whose frequency is a function of engine speed.

The ECM is also electrically connected to a vehicle speed sensor 30 by electrical connector 70. In a preferred embodiment, the vehicle speed sensor 30 is a magnetic pick up sensor as described above. The vehicle speed sensor 30 is preferably located adjacent to an output of the transmission 25 and senses a gear tooth or teeth in the transmission 25. The vehicle speed sensor 60 produces a signal on connector 70 whose frequency is a function of the transmission output speed. The rear axle ratio and the tire size of the vehicle are typically stored in memory. Using those values the ECM 35 is able to calculate the vehicle speed as a function of the vehicle speed sensor 60 signal.

The ECM 35 is also connected to a compression brake switch 75. In preferred embodiment the compression braking switch 75 includes a two-position switch 77 having an "on" position and an "off" position. When the compression brake engaged switch 75 is in an on position, the ECM 35 enables the compression brake 15. Thereafter, and as is described more fully below with respect to FIG. 2, the compression brake 15 will be engaged under certain vehicle operating conditions.

Also connected to the ECM is a compression braking level switch 80. In a preferred embodiment the compression braking level switch 80 includes a three-position switch 85. Each of the three positions of switch 85 corresponds to a specific braking level output from the compression brake 15. For example if the switch 85 is in a first position, the ECM may energize solenoid 36 thereby causing two engine cylinders to perform the braking. If the switch 85 is in a second position, the ECM may energize solenoids 36,37 thereby causing four engine cylinders to perform engine braking. Finally, if the switch 85 is in a third position the ECM 35 may energize solenoids 36,37,38 thereby causing six engine cylinders to perform engine braking 15. As is known to those skilled in the art, increasing the number of engine cylinders performing engine braking increases the braking force exerted by the engine through the transmission to the rear wheels. Although FIG. 1 illustrates a three-position switch 85 and three solenoids 36,37,38 it will be recognized to those skilled in the art that the number of solenoids may be readily and easily varied and the number of positions on the compression braking level switch 80 may be varied without deviating from the scope of the present invention. For example, if an engine has eight cylinders a suitable compression brake 15 might include four solenoids and a four-position switch, thereby providing the vehicle operator with four different levels of engine braking.

As is known to those skilled in the art, the ECM 35 will generally include a microprocessor 90 and memory 95. The memory 95 will include both data 96 and software instructions 97 to perform the control of a preferred embodiment of the present invention. The software instructions are described in greater detail below in flowchart form with reference to FIG. 2.

Also connected to the ECM 35 is a data input port 99. The data input port may be an input jack or other similar connector to allow an external programming device to input data into the memory 95. Typically, the data inputs are governed by SAE Standard number J1708 for on-highway trucks. Through the use of the data input port 99, a vehicle owner or fleet operator may input various data that affect software control of the compression brake control system 10.

Figure 2:
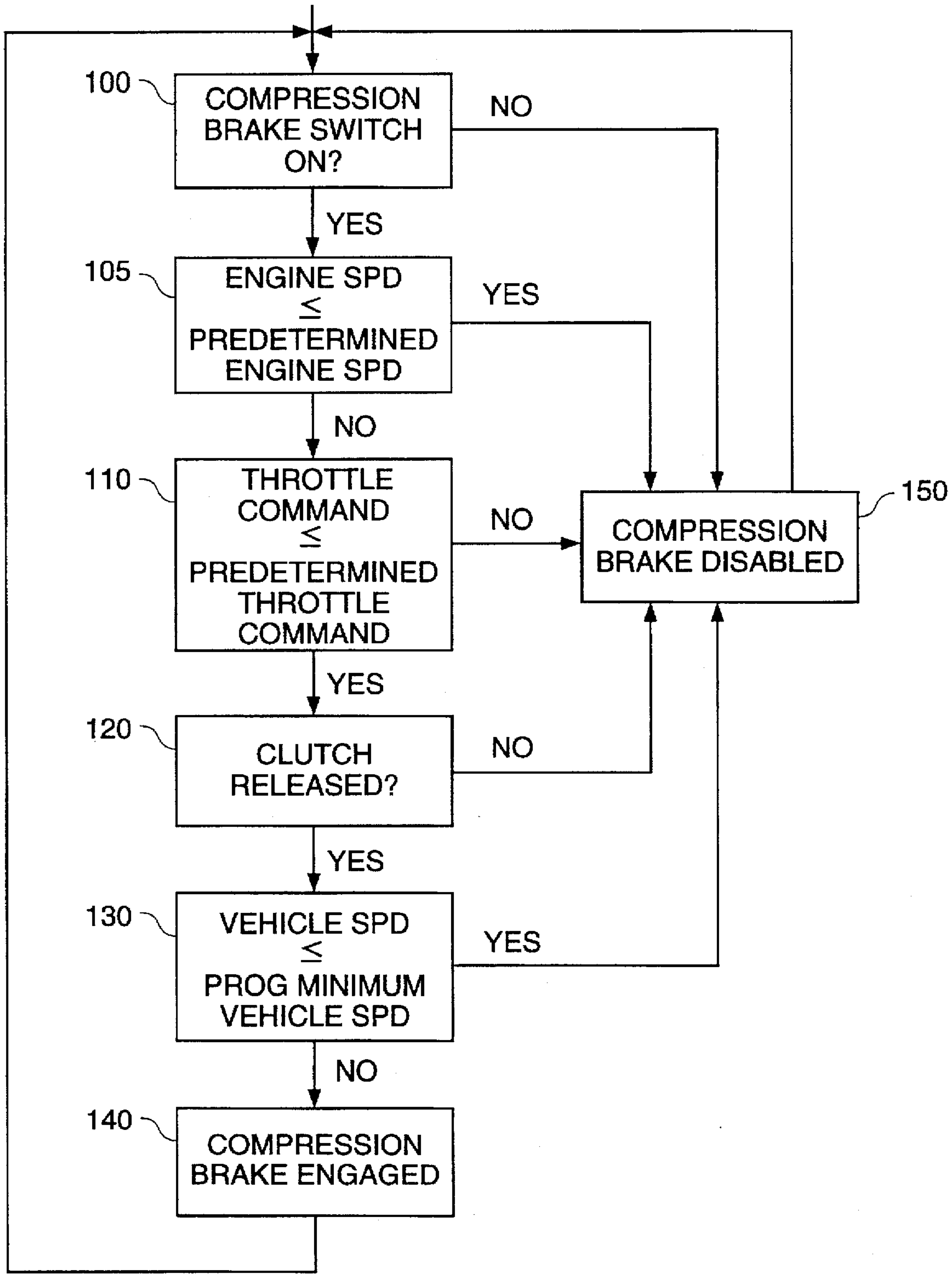
FIG. 2 is a flowchart of software associated with an embodiment of the invention.
Figure 3:
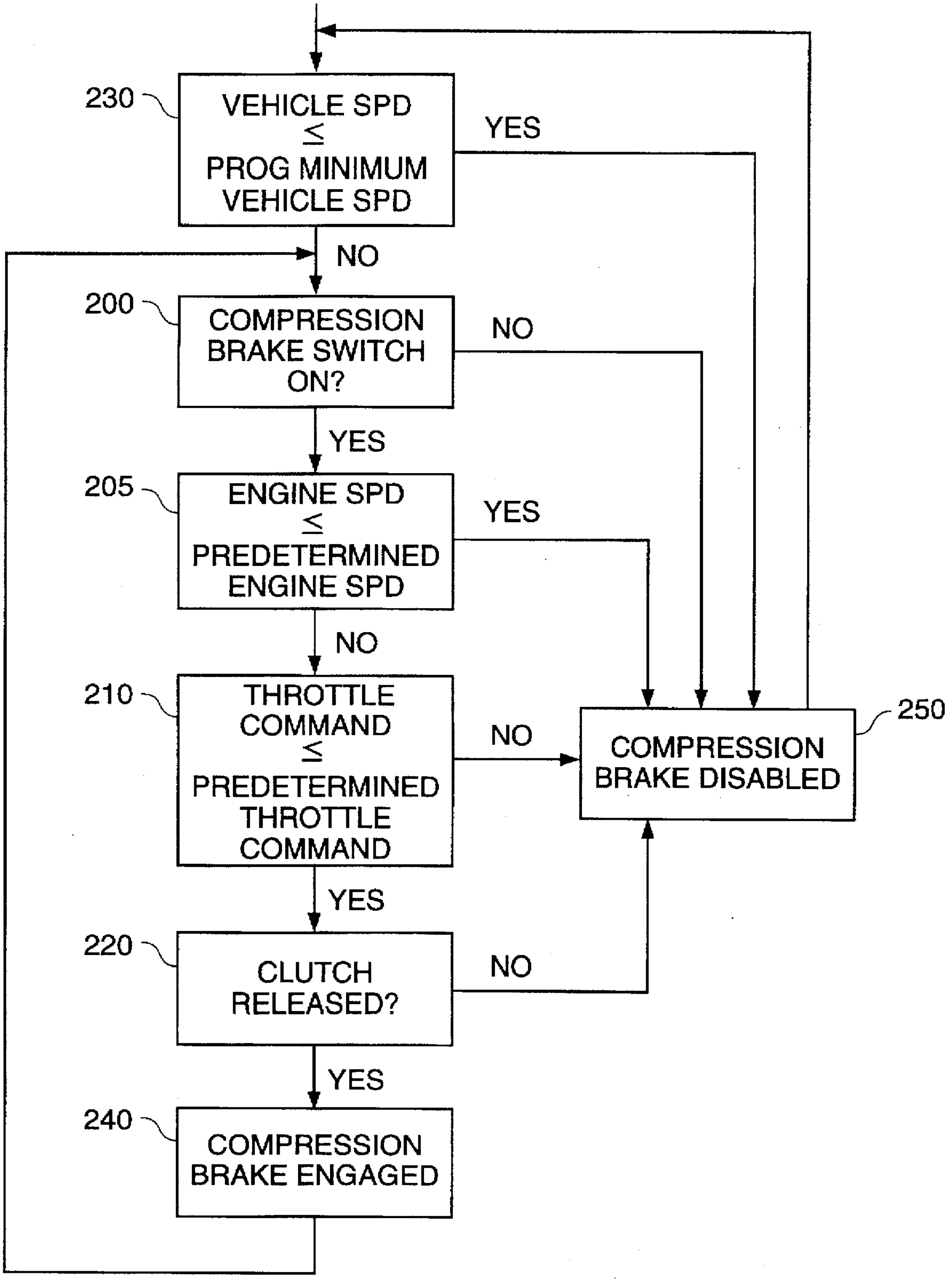
FIG. 3 is a flowchart of a preferred embodiment of the software associated with the invention.

Referring now to FIG. 2 and FIG. 3, flowcharts showing the microprocessor control performed according to the software instructions stored in the instruction portion 97 of memory 95 are shown. The detailed flowcharts depicted represent a complete and workable design of preferred software programs and have been reduced to practice on the Series MC68HC11 microprocessor manufactured by Motorolla Semiconductors, Inc. located in Phoenix, Ariz. Software may be readily and easily coded from this flowchart using the instruction set associated with this microprocessor, or the instruction set of other suitable microprocessors. Writing the software from this flowchart is a mechanical step for one skilled in the art.

In the first block 100, the ECM 35 reads the input signal on electrical connector 76 from the compression brake switch 75. If the signal on connector 76 corresponds to the switch being in an "on" position then program control passes to block 105. Otherwise program control passes to block 150, where the ECM disables the compression brake 15.

In block 105, the ECM reads the engine speed signal produced by the engine speed sensor 60 on electrical connector 65. The ECM 35 compares the engine speed to a predetermined engine speed stored in memory 95. In a preferred embodiment the predetermined engine speed is 800 rpm. However, this value may be readily and easily changed for other engine 20 and compression brake 15 combinations. In block 105, if the engine speed as determined from the signal on connector 65 is less than or equal to the predetermined engine speed, then program control passes to block 150 where the ECM disables the compression brake 15. If, however, the engine speed is greater than the predetermined engine speed, then control passes to block 110.

In block 110, the ECM 35 reads the signal produced by the throttle pedal position sensor 50 on electrical connector 51. If the throttle command as determined by the signal on the electrical connector 51 is less than or equal to a predetermined throttle command, then software control passes to block 120. Otherwise software control passes to block 150 where the ECM 35 disables the compression brake 15.

In block 120, the ECM 35 reads the signal produced by the clutch pedal sensor 40 on electrical connector 41. If the signal on produced by the clutch pedal sensor 40 electrical connector 41 corresponds to the clutch pedal being released then software control passes to block 130, otherwise software control passes to block 150 where the ECM 35 disables the compression brake 15.

In block 130, the ECM 35 reads the signal on electrical connector 70 and calculates a vehicle speed. The ECM compares the vehicle speed to a programmed minimum vehicle speed stored in memory. Although the programmed minimum vehicle speed might be a factory default value programmed into memory that cannot be changed by the vehicle owner, in a preferred embodiment the programmed minimum vehicle speed is a programmable variable that can be controlled by the vehicle owner or fleet manager. That value is programmed using an external programming device connected to the data input port 99 and then stored in the data section 96 of memory 95. Alternatively, the programmed minimum vehicle speed could be selected by the vehicle operator through a dash display and selector. In block 130 the ECM compares the programmed minimum vehicle speed to the vehicle speed calculated from the signal on electrical connector 70. If the vehicle speed is less than or equal the programmed minimum vehicle speed then program control passes to block 150 where the ECM disables the compression brake. Otherwise software control passes to block 140. In block 140, since the conditions of blocks 100–130 have been satisfied, the compression brake 15 is engaged. Block 140 program control returns to the beginning of the control loop and verifies the condition of block 100. Likewise from 150 where the compression brake is disabled, program control returns to the beginning of the program loop and begins the step of block 100.

Referring now to FIG. 3, a flowchart for the software control of a preferred embodiment is shown. The software control for this embodiment uses the vehicle speed calculation as an initial determinant in engaging or disengaging the compression brake. Like the previous embodiment, if the vehicle speed is initially above the programmed minimum vehicle speed and the other conditions of blocks 200–230 are satisfied, then the compression brake is engaged in block 140. However, this alternative embodiment operates differently from the embodiment of FIG. 2 once the compression brake has engaged. In this embodiment, the compression brake will thereafter remain engaged irrespective of vehicle speed until one of the other conditions cause it to disengage. Thus, as shown in FIG. 3, the compression brake will remain engaged until the engine speed falls below the predetermined engine speed, the brake switch is turned off, the throttle is depressed or the clutch is depressed. The order of the software instruction represented by flowchart blocks 200–230 as shown in FIG. 3 is exemplary. The specific order in which each of the conditions is performed is not important so long as the overall flow and functionality shown in the flowchart is maintained.

The present invention provides an advantage over prior art compression brake control systems by providing the operator with an automatic disabling feature once the vehicle speed drops below a preprogrammed minimum vehicle speed. Thus, even though the operator has the compression brake engaged using the switch 75, and all of the conditions of software block 100, 105, 110,120 are satisfied, the compression brake will nevertheless be disabled if the vehicle speed is less than the preprogrammed minimum vehicle speed. Thus, if the vehicle owner or fleet manager programs a minimum vehicle speed corresponding to vehicle speeds at which the vehicle would be traveling in a city, the control system 10 of the present invention will automatically disable the compression brake 15 when the vehicle speed corresponds to those speeds for city driving. In this manner the operator may rely on the electronic control module to automatically disable the compression brake and thereby avoid fines and unwanted noise in conjested areas with heavy traffic.

We claim:

1. An apparatus for controlling the speed of a vehicle equipped with an internal combustion engine, comprising:

an electronic controller;

a compression brake electrically connected to said electronic controller and connected to said internal combustion engine;

vehicle speed sensing means, said vehicle speed sensing means producing a vehicle speed signal responsive to a speed of said vehicle;

wherein the electronic controller disables said compression brake responsive to said vehicle speed; and wherein the electronic controller disables said compression brake in response to a vehicle speed signal falling below a predetermined value.

2. An apparatus according to claim 1, including:

a data port connected to said electronic controller;

wherein said predetermined value is programmable and is programmed using an external programming device, connected to said data port.

3. An apparatus for controlling the speed of a vehicle equipped with an internal combustion engine, comprising:

an electronic controller;

a compression brake electrically connected to said electronic controller and connected to said internal combustion engine;

vehicle speed sensing means, said vehicle speed sensing means producing a vehicle speed signal responsive to a speed of said vehicle;

wherein the electronic controller disables said compression brake responsive to said vehicle speed;

a first switch connected to said electronic controller;

said first switch having an on position, said compression brake being enabled when said first switch is in the first position; and said compression brake being disabled when said vehicle speed signal represents a vehicle speed less than said predetermined value.

4. An apparatus for controlling the speed of a vehicle equipped with an internal combustion engine, comprising:

an electronic controller;

a compression brake electrically connected to said electronic controller and connected to said internal combustion engine;

vehicle speed sensing means, said vehicle speed sensing means producing a vehicle speed signal responsive to a speed of said vehicle;

wherein the electronic controller disables said compression brake responsive to said vehicle speed;

a first switch having an on position;

an engine speed sensor connected to said electronic controller, said engine speed sensor producing an engine speed signal;

a throttle connected to said engine;

a throttle position sensor connected to said throttle, said throttle position sensor producing a desired throttle command;

a clutch pedal;

a clutch pedal sensor, said clutch pedal sensor producing a clutch released signal when said clutch pedal is released; and wherein said electronic controller engages said compression brake when said first switch is in said on position, said engine speed is greater than a predetermined engine speed, said desired throttle is less than a predetermined throttle command, said clutch pedal sensor produces a clutch released signal, and said vehicle speed is greater than a predetermined vehicle speed.

5. An apparatus according to claim 4 wherein said electronic controller disengages said engaged compression brake when said engine speed is less than said predetermined engine speed, said desired throttle is greater than said predetermined throttle command, or said clutch pedal sensor produces a clutch depressed signal.

6. An apparatus according to claim 4, including:

a second switch, said second switch being connected to said electronic controller and having at least a first, second, and third position; and said compression braking produces a first, second and third level of braking, responsive to the position of said second switch, when said compression brake is engaged.

7. A method of operating a compression brake associated with an internal combustion engine on a vehicle, said method comprising the steps of:

determining the speed of the vehicle; and disabling the compression brake in response to said vehicle speed being less than a predetermined value.

8. A method of operating a compression brake associated with an internal combustion engine on a vehicle, said method comprising the steps of:

determining if the compression brake is enabled;

determining the engine speed;

comparing the engine speed to a predetermined engine speed;

determining a throttle command;

comparing the throttle command to a predetermined determined throttle command;

determining whether a vehicle clutch pedal is realeased;

determining the speed of the vehicle;

comparing the vehicle speed to a predetermined vehicle speed; and engaging the compression brake in response to the compression brake being enabled, the engine speed being greater than the predetermined engine speed, the throttle command being less than a predetermined throttle command, the clutch pedal being released and the vehicle speed being less than the predetermined vehicle speed.

9. The method according to claim 8, after said step of engaging, including the step of:

disengaging the compression brake in response to either the engine speed being less than the predetermined engine speed, the throttle command being greater than a predetermined throttle command, or the clutch being depressed.

* * * * *